UNITED STATES PATENT OFFICE.

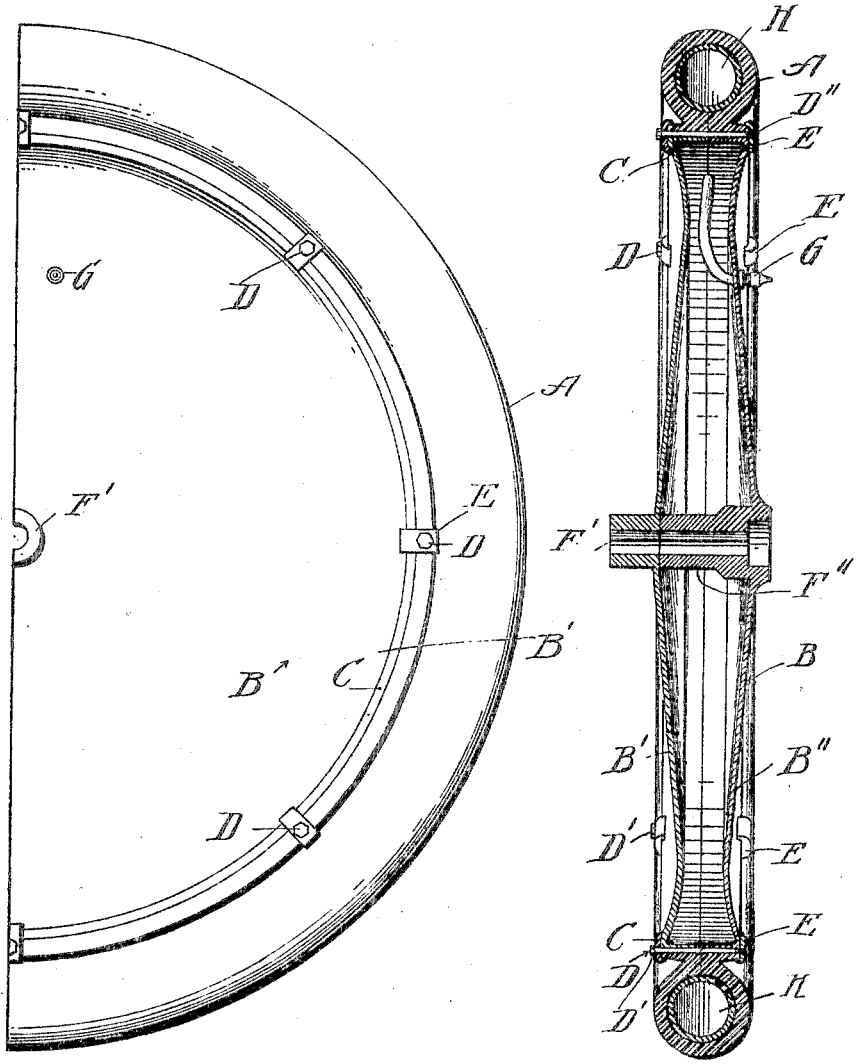

DAVID C. McCAN, OF LOS ANGELES, CALIFORNIA.

WHEEL.

No. 797,778.  Specification of Letters Patent.  Patented Aug. 22, 1905.

Application filed August 30, 1904. Serial No. 222,761.

*To all whom it may concern:*

Be it known that I, DAVID C. McCAN, a citizen of the United States, residing at Los Angeles, in the county of Los Angeles and State of California, have invented new and useful Improvements in Wheels, of which the following is a specification.

My invention has relation particularly to spokeless wheels; and it consists in casting an inner and outer member and assembling these two members together to form a wheel. My wheel is particularly adapted for use on automobiles on which rubber tires are used; and the object of my invention is to simplify the construction of wheels, to do away with the use of spokes, which have a tendency to retard the movement of the wheel and to scatter the dust which is caused to rise by the rapid revolution of the wheel, to strengthen the wheel, and to otherwise improve the same. I accomplish these objects by means of the device described herein and shown in the accompanying drawings, in which—

Figure 1 is a side elevation of a half of one of my wheels with a pneumatic tire in place thereon. Fig. 2 is a central vertical section of a wheel embodying my invention.

In the drawings, A is the pneumatic rubber tire in place on one of my improved wheels.

My wheel is composed of two members B' and B'', cast separately and in such shape that they may be assembled together, and thereby form a complete wheel. These members are cast, preferably, out of suitable metal in the proper proportion to give strength, lightness, and rigidity to the wheel when assembled.

I have shown in the drawings an assembled wheel suitable for the attachment thereon of a detachable tire with a tire in place thereon. The tire is secured to the rim C of the wheel. For the purpose of securely holding the tire in place the tire carries on its inner perimeter eight tube-securing bolts D, each having a head D' at one end for holding a tire-securing plate E, through which the bolt passes and being screw-threaded at the other end D'' for screw-threaded engagement with another tire-securing plate E. These bolts will securely hold the tire in place on the wheel.

G represents the conventional valve by means of and through which the inner tube H of the tire is inflated and deflated.

The outer member B' of my wheel is cast with a small projecting hub portion F', and the inner member B'' is cast with a larger hub portion F'', which projects inwardly and forms the principal part of the hub. These members when properly cast and finished will securely fit together and form a plain wheel of light weight and great rigidity.

Having described my invention, what I claim as new, and desire to secure by Letters Patent, is—

1. A wheel composed of two sheet-metal members having inwardly-projecting peripheral flanges which when together constitute the wheel-rim, in combination with a tire, clips and bolts which pass through the clips and between the flanges and the tire.

2. A wheel composed of two members having inwardly-projecting flanges at the periphery which when together constitute the wheel-rim, said members dished out or concavo-convex from rim to hub whereby the wheel is thicker at the rim than the immediately-adjacent portion, a tire around the rim, clips embracing the edges of the tire and the wide rim portion, the ends of the clips slightly flanged for this purpose, and bolts extending through the clips placed on opposite sides of the wheel whereby to embrace and hold the members of the wheel and edges of the tire together.

In witness that I claim the foregoing I have hereunto subscribed my name this 23d day of August, 1904.

D. C. McCAN.

Witnesses:
 HENRY T. HAZARD,
 G. E. HARPHAM.